(12) United States Patent
Metsa (10) Patent No.: US 7,628,927 B2
(45) Date of Patent: Dec. 8, 2009

(54) REACTOR FOR REMOVING CHEMICAL AND BIOLOGICAL CONTAMINANTS FROM A CONTAMINATED FLUID

(75) Inventor: Janet C. Metsa, Houghton, MI (US)

(73) Assignee: Vesitech, Inc., Hancock, MI (US)

( * ) Notice: Subject to any disclaimer, the term of this patent is extended or adjusted under 35 U.S.C. 154(b) by 919 days.

(21) Appl. No.: 11/302,882

(22) Filed: Dec. 14, 2005

(65) Prior Publication Data

US 2009/0277775 A1     Nov. 12, 2009

(51) Int. Cl.
*C01B 13/11* (2006.01)
(52) U.S. Cl. .................. 210/748; 210/742; 422/216; 422/144
(58) Field of Classification Search .................. 210/600, 210/739, 742, 748; 422/216, 144; 208/64, 208/49, 120.01
See application file for complete search history.

(56) References Cited

U.S. PATENT DOCUMENTS

| | | | |
|---|---|---|---|
| 1,931,436 A | 10/1933 | Deutsch | |
| 2,000,017 A | 5/1935 | Heinrich et al | |
| 2,509,548 A | 5/1950 | White | |
| 3,979,193 A | 9/1976 | Sikich | |
| 4,066,526 A | 1/1978 | Yeh | |
| 4,313,739 A | 2/1982 | Douglas-Hamilton | |
| 4,481,017 A | 11/1984 | Furlong | |
| 4,602,928 A * | 7/1986 | Eastin | 71/58 |
| 4,650,555 A | 3/1987 | Rzad et al. | |
| 4,695,358 A | 9/1987 | Mizuno et al. | |
| 5,236,672 A | 8/1993 | Nunez et al. | |
| 5,310,955 A | 5/1994 | Shirtum et al. | |
| 5,464,513 A | 11/1995 | Goriachev et al. | |
| 5,464,590 A | 11/1995 | Yount et al. | |
| 5,549,795 A | 8/1996 | Gregoire et al. | |
| 5,630,915 A | 5/1997 | Greene et al. | |
| 5,695,619 A | 12/1997 | Williamson et al. | |
| 5,766,447 A | 6/1998 | Creijghton | |
| 5,827,488 A | 10/1998 | Bahu et al. | |
| 5,843,383 A | 12/1998 | Williamson et al. | |
| 5,855,855 A | 1/1999 | Williamson et al. | |
| 5,961,693 A | 10/1999 | Altman et al. | |
| 5,972,076 A | 10/1999 | Nichols et al. | |

(Continued)

*Primary Examiner*—Michael A Marcheschi
*Assistant Examiner*—Cameron J Allen
(74) *Attorney, Agent, or Firm*—Brooks Kushman P.C.

(57) ABSTRACT

A reactor apparatus and method for removing chemical and biological contaminants from a contaminated fluid while minimizing disinfection by-products, sludges, and harmful residue. The reactor has a sequential, multi-stage, reaction vessel with an upper end region and a lower end region. The vessel has a liquid inlet port into which the contaminated fluid may pass. Treated liquid may exit the reactor through a liquid outlet port. A gas inlet port and a gas outlet port are provided. A plurality of stacked reaction chambers have a sieve tray and flange assembly, the sieve tray having holes up through which a gaseous phase may pass. A gas phase electrode, an electrical power supply capable of producing pulsed electrical discharges connected thereto, and a liquid phase electrode are provided. The electrodes create therebetween a pulsed corona discharge for generating reactive species in situ and destroying bacterial contaminants in the liquid. A weir-downcomer tube has an upper portion situated above a level of liquid in the associated chamber. The lower portion is situated below a level of liquid in a reaction chamber next below. The weir-downcomer tube minimizes or prevents back flow of liquid from a reaction chamber to an upstream reaction chamber.

20 Claims, 4 Drawing Sheets

U.S. PATENT DOCUMENTS

| | | |
|---|---|---|
| 6,027,616 A | 2/2000 | Babko-Malyi |
| 6,033,565 A | 3/2000 | Van Heesch et al. |
| 6,063,168 A | 5/2000 | Nichols et al. |
| 6,096,118 A | 8/2000 | Altman et al. |
| 6,193,934 B1 | 2/2001 | Yang |
| 6,264,898 B1 | 7/2001 | Ingram |
| 6,365,112 B1 | 4/2002 | Babko-Malyi et al. |
| 6,455,014 B1 | 9/2002 | Hammerstrom et al. |
| 6,488,819 B2 | 12/2002 | Conrad et al. |
| 6,491,797 B1 | 12/2002 | Locke et al. |
| 6,554,975 B2 | 4/2003 | Dammann et al. |
| 6,576,202 B1 | 6/2003 | Chiu |
| 6,652,715 B2 | 11/2003 | McLaine |
| 6,695,953 B1 | 2/2004 | Locke et al. |
| 2002/0014400 A1 | 2/2002 | Zadiraka et al. |
| 2002/0170817 A1 | 11/2002 | Goudy, Jr. |
| 2002/0175068 A1 | 11/2002 | Hammerstrom et al. |

* cited by examiner

Fig. 4: Normalized phenol concentration operating the MEDiC with and without corona Fig. 5: Absorbance at 610 nm reflecting the concentration of the reactive blue 137 dye during 'no-corona - bubbling of $O_3$ containing Ar/$O_2$-mixture' and corona operation

REACTOR FOR REMOVING CHEMICAL AND BIOLOGICAL CONTAMINANTS FROM A CONTAMINATED FLUID

BACKGROUND OF THE INVENTION

1. Field of the Invention

The invention discloses a unique reactor design and method for removing chemical and biological contaminants from a contaminated fluid.

2. Background Art

The quest continues to develop an improved process and apparatus that can be incorporated into an effective countermeasure system to destroy chemical and biological agents in water-based utility systems.

The prior art discloses methods of oxidizing organic contaminants and aqueous media using corona-induced reactions. One example is U.S. Pat. No. 6,488,819. Often, an electrical discharge is used to treat (decontaminate) a material in a single state—gas, liquid, or solid. One example is U.S. Pat. No. 3,979,193.

The prior art also includes separation processes—for example, removing solid particles from gas without changing their chemical nature. Additionally, some prior art discloses sequential reactors. See, e.g., U.S. Pat. Nos. 5,310,955; and 5,464,590. These reactors contain vertically aligned reaction chambers that are used for polymeric reactions. The reactions typically are catalytic. A catalyst is added to each reaction chamber or, in the case of a solid catalyst, contained within a tray. The vapor, or gas is a by-product that is removed in each stage.

U.S. Pat. No. 5,766,447 discloses six reactive configurations, but does not involve more than one reaction vessel. The role of un-reacted gaseous ozone is addressed by recycling into the single reaction chamber that lacks a gas phase electrode. The '447 patent is incorporated herein by reference.

The following additional U.S. patents were identified in pre-filing investigations: U.S. Pat. Nos. 4,695,358; 5,464,513; 5,236,672; 6,033,565; 6,264,898; 2002/0170817A1; 2002/0014400A1; 6,193,934; 6,027,616; 5,695,619; 5,855,855; 5,549,795; 4,650,555; 2,509,548; 2,000,017; 6,365,112; 5,961,693; 6,096,118; 5,972,076; 6,063,168; 5,827,488; 4,481,017; 4,313,739; 4,066,526; 1,931,436; 6,455,014; 2002/0175068A1; 6,652,715; 6,576,202; 6,554,975; 5,766,447; 5,630,915; 5,310,955; 5,372,790; and 5,464,590.

SUMMARY OF THE INVENTION

The invention includes a reactor apparatus and method for removing chemical and biological contaminants from a contaminated fluid such as a liquid. The process minimizes the potential for producing disinfection by-products, sludges, and harmful residue. As used herein, the term "fluid" refers to the contaminated fluid that enters the reactor apparatus, and to modified fluid as it progresses through various stages of decontamination. The term "fluid" as used herein, does not refer to a gas or vapor that flows upwardly through the reactor apparatus.

The reactor is comprised of a sequential, multi-stage, air-free reaction vessel having an upper end region and a lower end region. The vessel has a fluid inlet port located proximate the upper end region into which the contaminated fluid may pass. A fluid outlet port is located proximate the lower end region through which treated liquid may exit the reactor.

A gas inlet port is located proximate the lower end region. A gas outlet port is located proximate the upper end region. The inlet and outlet ports are sized to permit a continuous flow.

A plurality of discrete, stacked reaction chambers is positioned between the upper and the lower end regions. At least some of the reaction chambers have a sieve tray and flange assembly, the sieve tray having holes up through which the gaseous phase may pass.

A gas phase electrode, an electrical power supply capable of producing pulsed electrical discharges connected thereto, and a liquid phase electrode are provided in one or more of the reaction chambers. The electrodes create therebetween a pulsed corona discharge, preferably including ultraviolet radiation for generating reactive species in situ and destroying bacterial contaminants in the incoming fluid. In one embodiment, the corona is counter-current to liquid flow. Heat generated by the corona is substantially dissipated by liquid flow, thereby making the process substantially isothermal. Reactive species such as ozone and/or hydrazine are transferred across a gas-liquid interface.

The reactor has one or more weir-downcomer tubes. Each has an upper portion and a lower portion. The upper portion is situated above a level of liquid in the associated chamber. The lower portion is situated below a level of liquid in a reaction chamber next below. The weir-downcomer tube minimizes or prevents back flow of liquid from a reaction chamber to an upstream (in relation to liquid flow) reaction chamber. Preferably, a gas-liquid interface in at least some of the chambers is substantially flat.

DETAILED DESCRIPTION OF THE PREFERRED EMBODIMENT(S)

Figure 1:
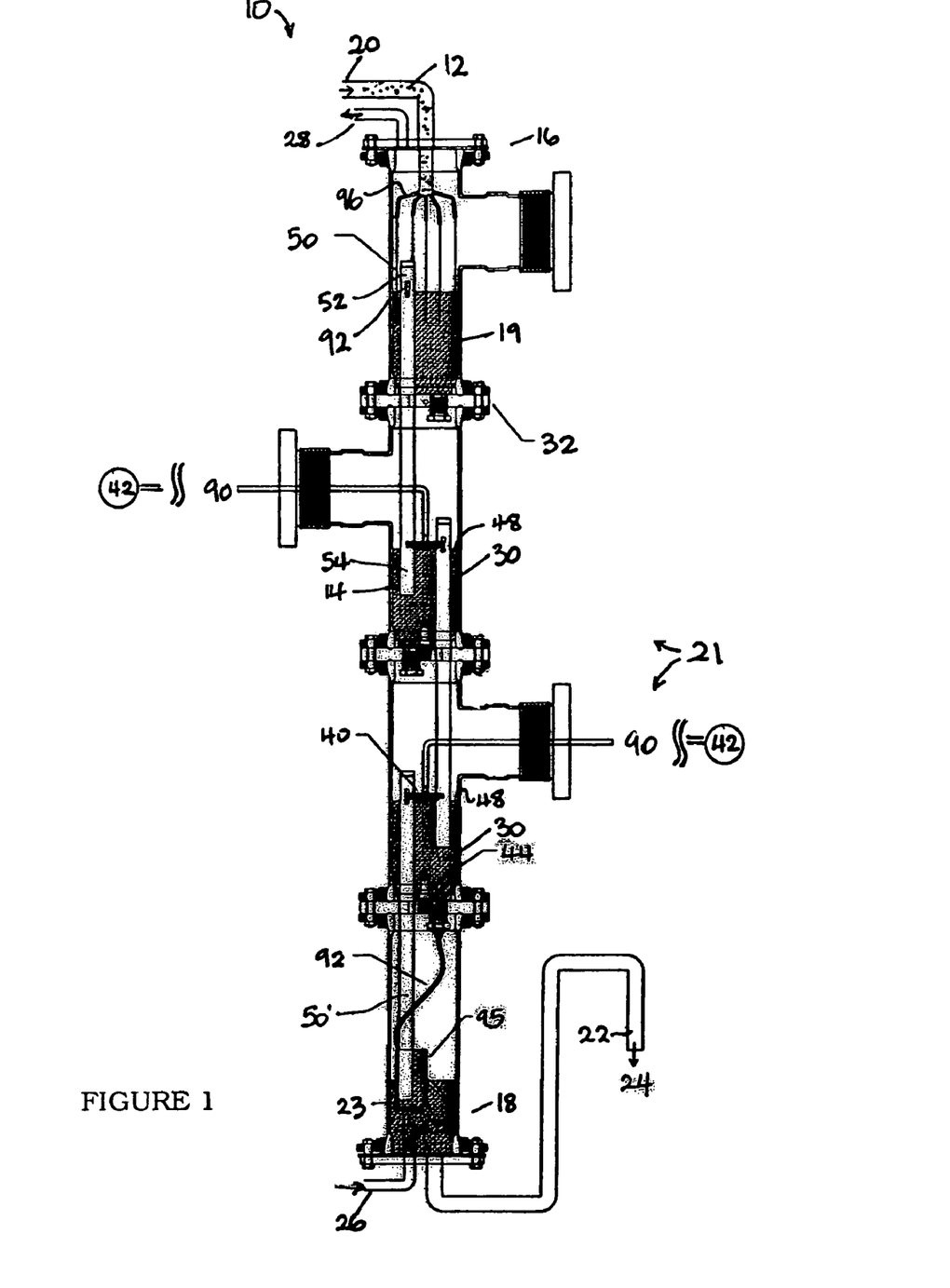
FIG. 1 is a vertical sectional view of a reactive vessel according to the present invention.
Figure 2:
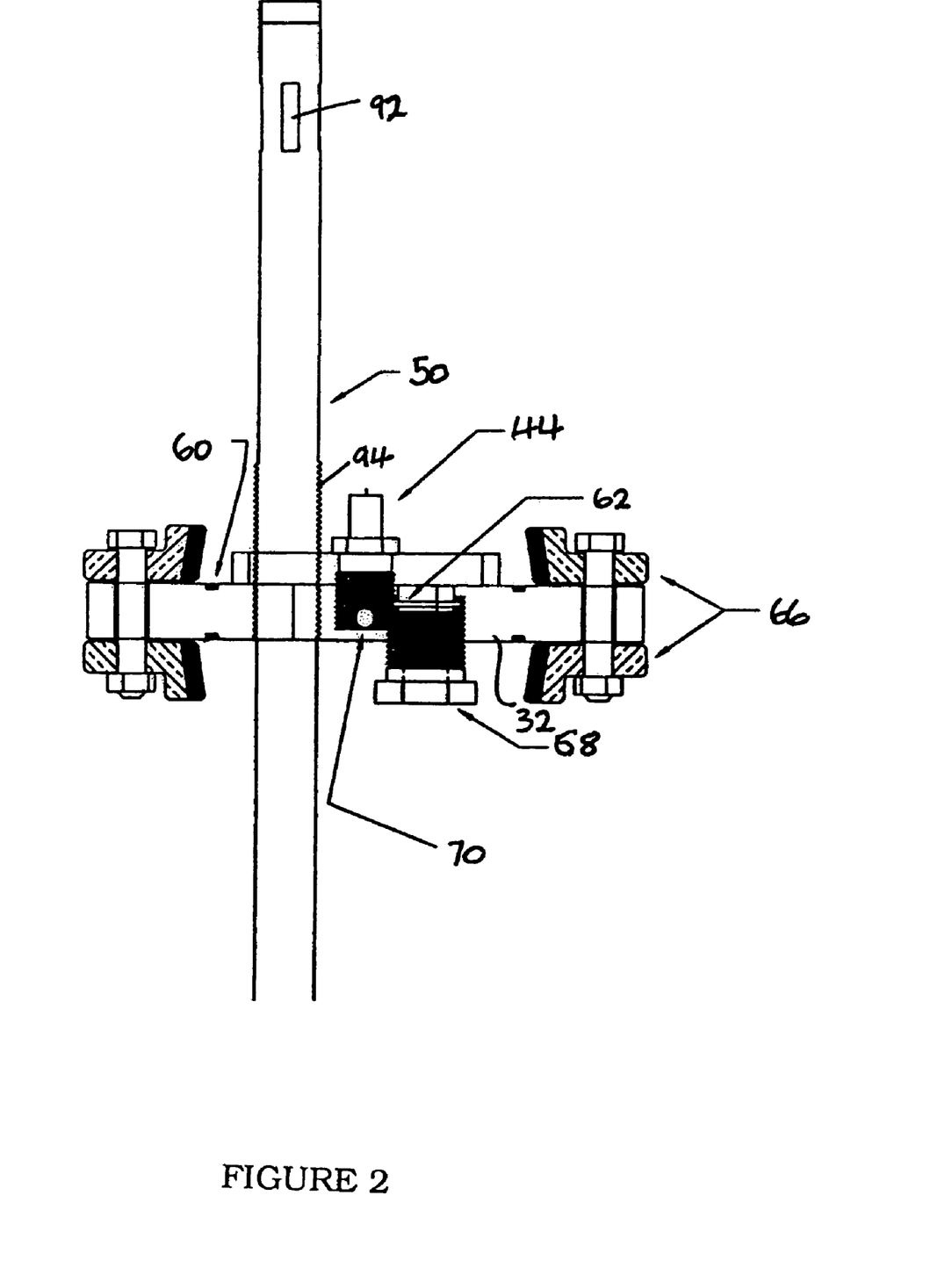
FIG. 2 is an enlarged, sectional view of a sieve tray and flange assembly together with a weir-downcomer tube associated with a reaction chamber in the reaction vessel.
Figure 3:
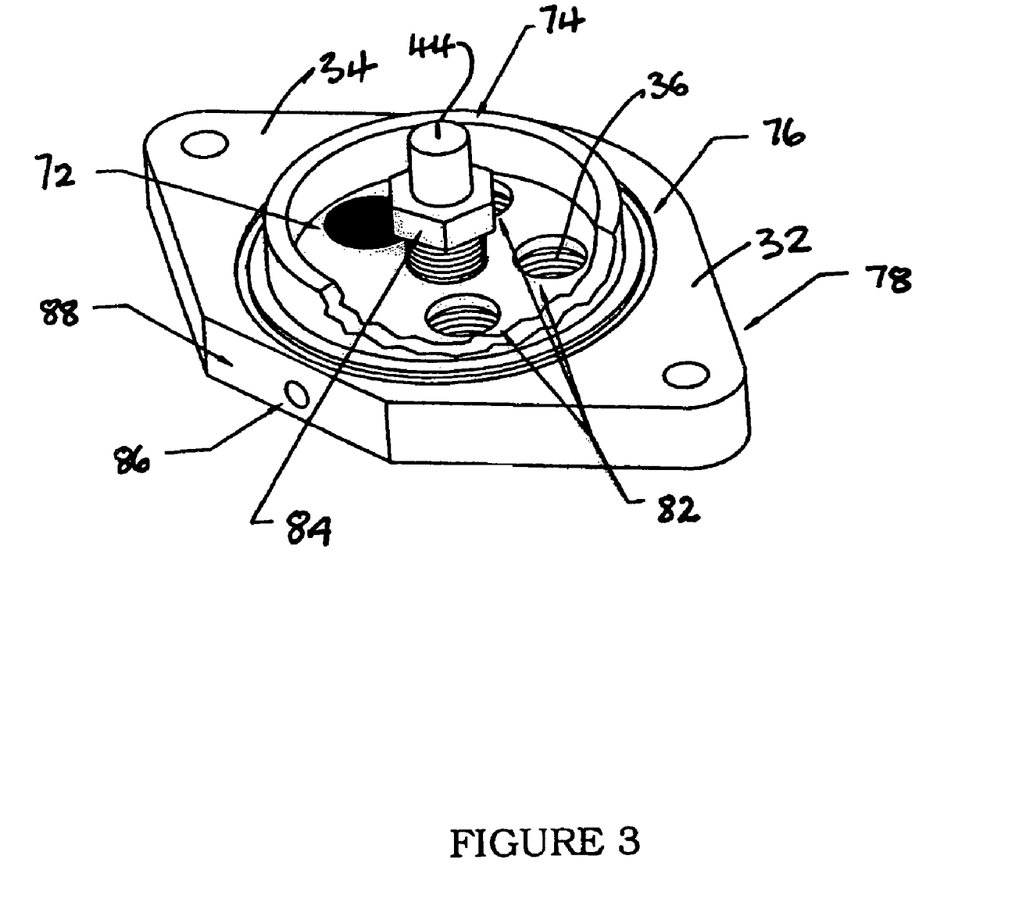
FIG. 3 is a quartering perspective view of the sieve-tray and flange assembly depicted in FIGS. 1-2.

FIGS. 1-3 depict various aspects of a reactor 10 that removes chemical and biological contaminants from a contaminated fluid 12. Using the disclosed apparatus and practicing the method minimizes the potential for producing disinfection by-products, sludges and harmful residue. The reactor 10 preferably includes sequential, multi-stage, air-free (i.e., sealed) reaction vessels 14 (FIG. 1). The series of vessels 14 has an upper end region 16 and a lower end region 18. At the upper end region, the fluid/liquid to be treated enters the reaction vessel through a fluid inlet port 20. After passing through a scrubbing stage 19, an operational stage 21 and a base stage 23, treated liquid 24 exits the reaction vessel 14 at one or more fluid outlet ports 22.

A gaseous phase enters the gas inlet port 26 at the lower end region 18 of the reaction vessel 14. Preferably, the gaseous phase includes an oxidizing gas selected from the group consisting of oxygen or a reducing gas such as 3% hydrogen in nitrogen and mixtures thereof. After passing through one or more reaction chambers 30, a modified gaseous phase exits the reaction vessel 14 at one or more gas outlet ports 28 that are situated in the upper end region 16 of the reaction vessel 14. It will be appreciated that the fluid and gas inlets and outlets are depicted in FIG. 1 as being associated with an upper or lower end region. It will be appreciated that they need not be in a distal end of the vessel as depicted. Instead, they could be situated as emerging from a wall portion laterally and proximate to one of the ends of the reactor 10.

Located between the upper and lower end regions 16,18 of the reaction vessel 14, there is a plurality of discrete, stacked reaction chambers 30. One purpose of providing discrete stacked reaction chambers 30 is to provide a progressive or staged system whereby a contaminated liquid is progressively purified as it passes through successive stages. Thus, an intermediate reaction product emerging from a first reaction vessel enters a subsequent reaction vessel which in turn creates a lower level of contamination that is passed on to any subsequent reaction chamber 30.

At least some of the reaction chambers 30 have a sieve tray and flange assembly 32 that is depicted in more detail in FIGS. 2-3. The sieve tray 34 has holes 36 up through which the gaseous or vapor phase may pass.

In a preferred embodiment, at least some of the reaction chambers 30 are provided with a gas phase electrode 40 to which an electrical power supply 42 is connected by (preferably) a high voltage wire 90.

A pulsed-corona discharge is created between the gas phase electrode 40 and the liquid phase electrode 44 in a given reaction chamber 30. The pulsed corona-discharge generates reactive species (such as ozone and/or hydrazine) in situ and preferably includes ultraviolet radiation. It is believed that highly reactive species are transferred across a gas-liquid interface 48. Those species destroy bacterial and chemical contaminants in the contaminated fluid 12. Preferably, the corona are counter-current to liquid flow.

The generation of reactive species in situ is substantially isothermal because heat generated by the corona is substantially dissipated by liquid flow.

The generation of reactive species in-situ may be enhanced by the addition of oxidizing agents such as oxygen in the gas phase, or hydrogen peroxide in the liquid phase. The generation of reducing reactive species in-situ may also be enhanced by the addition of reducing agents such as 3% hydrogen in the gas phase.

In the embodiment depicted in FIG. 1, there are three weir-downcomer tubes 50 that communicate between adjacent stages of the reactor 10. Each tube 50 has an upper portion 52 and a lower portion 54. An aperture 92 is provided in the upper portion 52 of each downcomer tube 50.

As contaminated liquid enters the reaction vessel 14 at the fluid inlet port 20, it is optionally ducted through and dispersed by a liquid distribution system 96, such as various sprays or nozzles. The distribution system 96 tends to disperse the contaminated fluid as it enters the scrubbing stage 19.

Consider the liquid flow conditions as an empty reactor 10 is primed with contaminated fluid. The contaminated fluid 12 enters the scrubbing stage 19 and its meniscus rises until it reaches the aperture 92. The elevation of the aperture 92 can be adjusted by any suitable means such as a threaded engagement 94 between the downcomer tube 50 and an associated sieve tray and flange assembly 32. In FIG. 3, for example, reference numeral 72 identifies a threaded downcomer hole that permits fine adjustment of the water level.

Returning to FIG. 1, as the level of contaminated fluid begins trickling through aperture 92, it falls downwardly along the downcomer tube 50 into the reaction chamber 30 below. Upon entering that reaction chamber 30, the liquid level rises again until it flows further downwardly through an aperture associated with the downcomer tube supported within the reaction chamber 30, i.e., its neighbor below, and so on.

At the base stage 23, the progressively purified liquid level rises. Optionally, a well 98 serves as an interim storage location before emerging from the base stage 23 through the fluid outlet port 22.

Optionally, valves are provided in the fluid and gas flow lines outside the reaction vessel 14.

Thus, the weir-downcomer tubes 50 have upper portions 52 and lower portions 54. The upper portions 52 are situated above a level of liquid in the associated reaction chamber 30. The lower portion 54 is situated below a level of liquid in the reaction chamber next below. Thus, the weir-downcomer tube 50 arrangement minimizes or prevents backflow of liquid from a reaction chamber to an upstream reaction chamber.

Flow tends to be quiescent and a gas-liquid interface in at least some of the reaction chambers is substantially flat.

In FIG. 2, tray sealing rings 60 are provided. Preferably, sparger or diffusor 62 and O-rings 64 are also provided. The reference numeral 66 designates a flange set. Optionally, sparger or diffusor sealing caps 68 are threadingly engaged in an underside of the sieve tray and flange assembly 32 (FIGS. 2-3). In FIG. 2, the liquid phase electrode 44 is provided with a high voltage access port 70.

Turning now to FIG. 3, there is depicted a threaded downcomer hole 72 which, as mentioned earlier, provides for fine adjustment of the water level. Raised wall guides 74 support a reaction chamber 30 with respect to the tray 34. Optionally, an O-ring groove 76 is provided on the upper and lower faces of each tray 34. Preferably, the tray 34 includes an oblong platform 78 to accommodate the coupling flanges 66 (FIG. 2).

Hollow caps 68 seal the area around sparger or diffusors 82. These spargers or diffusers are microporous and create small bubbles. As depicted in FIG. 3, the electrode fittings 84 permit ready replacement of the liquid phase electrodes 44. In FIG. 3, the reference numeral 86 designates the aperture 70 (FIG. 2) that permits lateral access to the center of the tray 34 for a high voltage cable.

As best shown in FIG. 3, preferably, the tray includes flat surfaces 88 that facilitate drilling into the tray.

Thus, the invention includes a staged flow-through reactor system that contains gas and aqueous streams which can incorporate high voltage electrical discharge—particularly a pulsed streamer high voltage corona discharge—preferably, in each stage.

Decontamination is based upon the generation of a high voltage electrical discharge in water to create in-situ oxidizing compounds. These compounds in turn react with and destroy the contaminants contained in the incoming water stream.

In one embodiment, the reactor includes a vertical, cylindrical, glass column with several sections or stages (FIG. 1) that are separated by uniquely designed trays (FIGS. 2-3) that are attached to a support structure (not shown) by a flange assembly.

Each reaction chamber 30 has a (preferably controlled) liquid stream flowing into it. A controlled gas stream flows upwardly, countercurrent to the liquid. Preferably, the gas and liquid are separated by a quiescent interface. The height of the downcomer tube 50 above each tray 32 regulates the liquid level in each stage. The adjustable weir overflow height control (downcomer 50) provides a fine adjustment of the liquid level. The fluid flow is controlled by a pump external to the reactor.

An orifice is provided in the side of each reaction vessel 14 for installing the gas phase electrode 40 whereby the pulsed corona discharge is generated at the gas and liquid interface 48.

Turning again to FIG. 3, it can be seen that the sieve tray and flange assemblies 32 incorporate several components that are useful in the operation of the disclosed flow-through system. The trays 34 include threaded orifices 72 for the downcomer liquid flow tube by which the liquid level can be adjusted. Optionally, the reactor 10 can be fitted with remotely located means for adjusting the height of the downcomer tubes. Such means include, for example, an electrical circuit including a motor with a gearing system that can rotate a threaded tube so that it may move upwardly or downwardly in relation to a sieve tray and flange assembly 32.

The raised wall 74 guides the wall (preferably glass) into the tray 34. A water-tight seal is provided by O-rings that are seated in grooves 76. The microporous discs distribute the gas coming from below through the tray into the fluid volume above in a manner which creates a well-mixed two phase system (bubbles) and in a way that does not cause the gas-liquid interface to become turbulent.

One aspect of the multi-stage feature of the invention is that the gas phase from one reaction chamber 30 contains residual, un-reacted ozone which can be entrained into the reaction chamber above and thus be further utilized. In this way, the gas-phase becomes more concentrated in ozone from one stage to the next.

This produces the counterintuitive result from other ozone reactors in that the gas-liquid contact pattern is counter-current. This maximizes the local concentration of both reactants in each phase and thereby maximizes the reaction rate.

Preferably, the liquid in each stage is well mixed. By bubbling, the gas phase containing the ozone through the liquid phase, natural mixing is induced and the gas-liquid mass transfer is enhanced.

Preferably, a distinct boundary is desirable between the gas and liquid phases. This is mechanically achieved with the weir overflow height controller 50. A constant liquid level is maintained above each tray via the aperture 92 (weir overflow) arrangement at the top of each downcomer tube 50.

Under low flow operating regimes, the water distributor 96 can be dispensed with.

Preferably, the reactor 10 is grounded and the reaction chamber 30 are electrically isolated for safety.

The bottom or base stage 23 (including the fluid outlet 22 and gas inlet 26 ports) is used to equilibrate the internal pressure in the reactor 10. In the base stage 23, the bottom downcomer 50' is fitted with a well 95 to prevent gas from rising through the downcomer rather than the tray. The gas line 92 connects the gas inlet port 26 to the lowermost sieve tray and flange assembly 32.

Preferably, the distance between the gas phase electrode 40 and the liquid surface is between about 2 and 5 mm. Smaller distances result in intermittent contact with the water surface; larger gaps result in fewer discharge points on the gas phase electrodes which limits the creation of reactive species.

The disclosed process generates several highly reactive species in situ, including oxidizing or reducing species (e.g. ozone and/or hydrazine). The reactivity of these species is preferably augmented by the production of an intense ultraviolet irradiation in the discharge. The strong oxidants are produced in sufficient quantities to rapidly degrade a wide range of organic and hetero-atomatic molecular species. This process is also effective at oxidizing metal species including arsenic or radioactive species.

In one embodiment, there are between 6 and 8 stages in one column.

U.S. Pat. Nos. 6,695,953 and 6,491,797 were issued to Locke et al. These patents are incorporated herein by reference. The '953 patent discloses a non-thermal plasma process for oxidizing an organic contaminant in an aqueous medium. FIG. 2 of the '953 patent is a schematic of a pulsed streamer corona aqueous solution reactor which is essentially a single-stage reactor, unlike that disclosed in the present invention. Similar comments are applicable to the '797 patent.

EXAMPLES

Thus, FIG. 1 illustrates one embodiment of a reactor used in accordance with the present invention. Each stage performs one or more specific tasks in experiments that were conducted. In one embodiment, the uppermost stage is a scrubbing stage, in which accumulated ozone can be dissipated in the process of destroying contaminants in the entering fluid; or a corona stage as described in the following sentences. Next lower, are two corona stages wherein a plurality of electrodes produce a corona discharge.

An additional orifice has been made in each tray for the installation of sampling ports controlled by PVC needle valves.

The Base stage, the lowermost, allows for some flux in the flow rates of fluids entering the reactor, while maintaining a desired fluid level in each of the corona stages.

With the exception of the base stage, each stage in one embodiment is a glass tube with a 3" ID shaped as an asymmetrical "T", 12 in. tall with a 4 in. leg. The Base stage has no need of a leg, and preferably is a glass tube. All stages have flared ends at top and bottom which rest either on a tray or an endplate. Flanges (preferably made of aluminum) with a hexagonal hole arrangement are used to hold the trays and stages in place and to seal them from the outside environment.

Additionally, a pump—such as a Cole-Parmer Gear Pump with a Micropump Pump Head—moves the fluid through the reactor at a rate (in one series of experiments) of 1.17 mL/rev. Using a Cole-Parmer direct-reading flow meter, the fluid was preferably pumped at a rate of 500 ml/min through the reactor and then returned to a polyethylene tank. In one example, the reservoir contained 5 L of a solution containing 88 p.m. phenol and a small amount of potassium chloride to raise the conductivity of the fluid—preferably to approximately 150 as. Conductivity, pH, temperature, and hydrogen peroxide concentration are preferably measured from this reservoir and from sampling ports in the corona stages every ten minutes during a run.

Gas cylinders containing argon and oxygen supply gas to the reactor which is metered out through an MKS Flow Controller at a preferred rate of 200 ml/min of argon and 150 ml/min of oxygen. In one set of experiments, pulsed energization of the high voltage discharge electrodes in each corona stage was provided by a rotating spark gap power supply, with a peak voltage in the range of about 40-55 kV, pulse width of 500-1000 ns, pulse rise time of 20-100 ns, and a repetition frequency of 60 Hz. The high voltage electrode consisted of a variety of materials and geometries. In one embodiment, the electrode was a nickel-chromium wire, with a thickness of 0.75 mm, that protruded 1-2 mm above a polyethylene fitting.

In the series configuration, which is the preferred embodiment for the experiment, a grounded electrode was held 4-25 mm above the fluid surface. The electrode was shaped as a circle with symmetrical concave regions removed on both sides to accommodate the downcomers in each stage. This gas-phase electrode was made from Reticulated Vitreous Carbon (RVC) secured to a steel screen and rod assembly that was supported by a large nylon plug in the leg of the stage. The end of the rod protruded from the reactor and was connected to the grounding network—a 6" copper sheath, ultimately leading to an earth ground.

Streamer coronas propagate outwardly from the central discharge region located at the tip of the needle point and from numerous points on the RVC down to the fluid surface. With streamers in both the gas and liquid phase, ozone, hydrogen peroxide, hydroxyl radicals, and ultraviolet light are all produced. In one embodiment, three stages are active corona stages, in which the destruction of phenol and reactive blue 137 have been tested. As mentioned above, one experiment used a solution of phenol with an initial concentration of 88 p.m.

Figure 4:
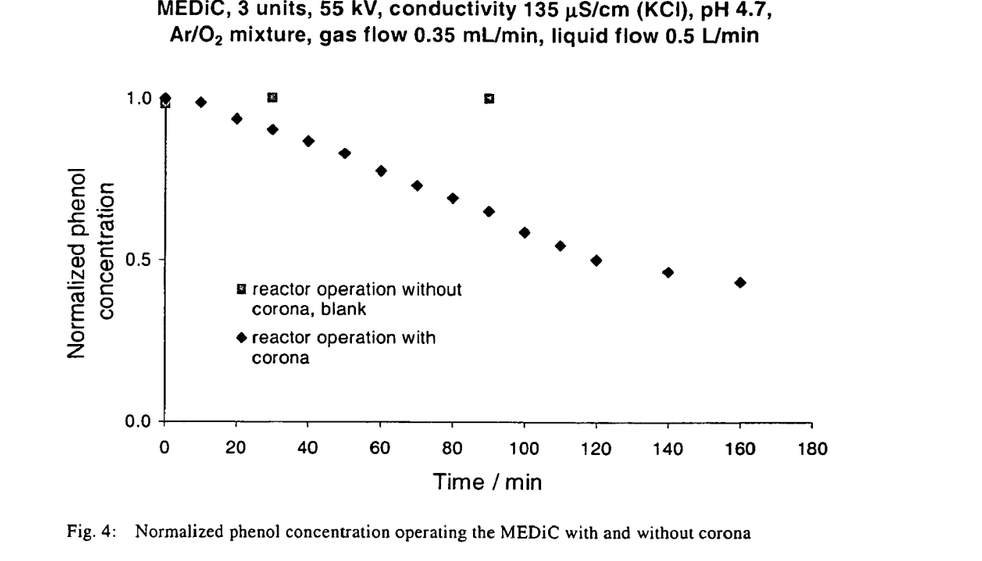
FIG. 4 is a graph of phenol concentration against time in a reactor with and without corona.

After 160 minutes of operation it was found that the concentration of phenol had been reduced by 60%, as shown in FIG. 4. The phenol degradation efficiency $G_{37}$ can be estimated based on first order kinetics with an energy consumption $P \times t_{37}$. Taking into account the overall water volume V and a 63% removal of phenol, this calculation results in a specific energy efficiency of 0.88 g/(kWh).

Figure 5:
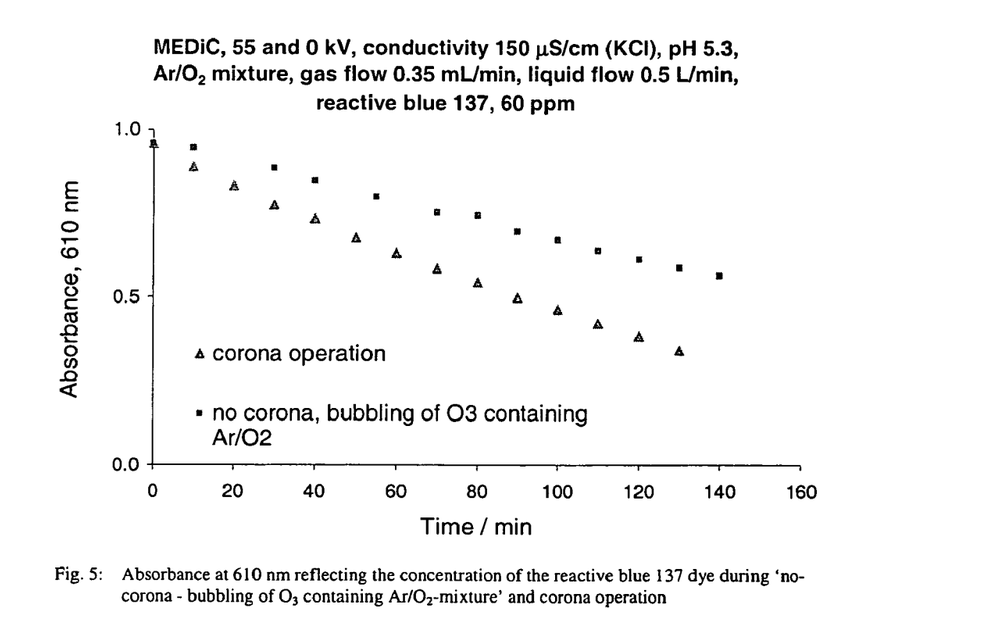
FIG. 5 is a graph of absorbance against time with and without corona with bubbling of ozone containing argon and oxygen.

Another experiment used a solution of reactive blue 137 with an initial concentration of 60 p.m. This experiment compared results from normal operation of the invention, to those reached by importing ozone into the invention while no discharge occurred. FIG. 5 shows the absorbance of samples taken during each of the two experiments. At 130 minutes, the solution that had been treated by corona discharge showed a 65% reduction in reactive blue 137 concentration. The test using an ozone generator to supply ozone to the invention resulted in a reduction in concentration of 35%. The 30% difference in destruction emphasizes the importance of producing OH radicals in the liquid phase.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A reactor for removing chemical and biological contaminants from a contaminated fluid while minimizing the potential for producing disinfection by-products, sludges, and harmful residue, the reactor comprising:
    a sequential, multi-stage reaction vessel having an upper end region and a lower end region, the vessel having
        a fluid inlet port located proximate the upper end region into which the contaminated fluid may pass;
        a fluid outlet port located proximate the lower end region through which treated liquid may exit the reactor;
        a gas inlet port located proximate the lower end region;
        a gas outlet port located proximate the upper end region, the inlet and outlet ports being sized to permit a continuous flow,
        a plurality of stacked reaction chambers positioned between the upper and the lower end regions, at least some of the reaction chambers having
            a sieve tray and flange assembly, the sieve tray having holes up through which a gaseous phase may pass;
            a gas phase electrode and an electrical power supply capable of producing pulsed electrical discharges connected thereto;
            a liquid phase electrode supported by the sieve tray, the electrodes creating therebetween a pulsed corona discharge for generating reactive species in situ and destroying bacterial contaminants in the liquid, heat generated by the corona being substantially dissipated by liquid flow, a reactive specie being transferred across a gas-liquid interface; and
            a weir-downcomer tube having an upper portion and a lower portion, the upper portion being situated above a level of liquid in an associated chamber, the lower portion being situated below a level of liquid in an reaction chamber next below, the weir-downcomer tube minimizing or preventing back flow of liquid from a reaction chamber to an upstream reaction chamber, a gas-liquid interface in at least some of the chambers being substantially flat.

2. The reactor of claim 1, wherein the sequential, multi-stage reaction vessel comprises two stacked reaction chambers.

3. The reactor of claim 1, wherein the sequential, multi-stage reaction vessel comprises three stacked reaction chambers.

4. The reactor of claim 1, wherein the sequential, multi-stage reaction vessel comprises four stacked reaction chambers.

5. The reactor of claim 1, further including a plurality of spray nozzles in fluid communication with the liquid inlet port for distributing the incoming contaminated fluid.

6. The reactor of claim 1, wherein the plurality of stacked reaction chambers is associated with three weir-downcomer tubes.

7. The reactor of claim 1, wherein the sieve tray and flange assembly comprises a threaded downcomer hole that receives a weir-downcomer tube so that its height can be adjusted.

8. The reactor of claim 7, further including a raised wall extending from the sieve tray for guiding a reaction chamber onto the tray.

9. The reactor of claim 8, further including an oblong platform for fitting coupling flanges.

10. The reactor of claim 9, further including a plurality of microporous distributors received within the sieve tray for creating small bubbles.

11. The reactor of claim 10, further including an access port for permitting electrical cable to be inserted through a wall of the sieve tray so that the liquid phase electrode can be energized.

12. The reactor of claim 1, wherein the flow of contaminated fluid is continuous.

13. The reactor of claim 1, wherein removal of chemical and biological contaminants from the contaminated fluid is substantially isothermal.

14. The reactor of claim 1, wherein at least some of the reaction chambers house an upper portion of one downcomer tube and a lower portion of another downcomer tube.

15. The reactor of claim 1, wherein the sequential, multi-stage reaction vessel include a scrubbing stage and operational stage, and a base stage, the base stage including a well situated therein.

16. The reactor of claim 1, wherein the sequential, multi-stage reaction vessel is substantially air-free.

17. The reactor of claim 1, wherein the pulsed corona discharge is accompanied by ultraviolet radiation.

18. The reactor of claim 1, wherein the corona are countercurrent to fluid flow.

19. A method for removing chemical and biological contaminants from a contaminated fluid, the method comprising:

using the reactor of claim 1 to apply a pulsed corona discharge to an aqueous medium containing contaminant in a sequential, multi-stage, air-free reaction vessel;
generating a sufficient quantity of a reactive specie in the aqueous medium; and
oxidizing the organic contaminants in the aqueous medium by reacting the specie with the organic contaminant in the aqueous medium.

20. A method of treating an aqueous solution by using the reactor of claim 1 in which a pulsed electric field is generated in the aqueous solution between two electrodes in each reaction chamber of a multi-stage, sequential, air-free reaction vessel.

* * * * *

UNITED STATES PATENT AND TRADEMARK OFFICE
CERTIFICATE OF CORRECTION

| | | |
|---|---|---|
| PATENT NO. | : 7,628,927 B2 | Page 1 of 1 |
| APPLICATION NO. | : 11/302882 | |
| DATED | : December 8, 2009 | |
| INVENTOR(S) | : Janet C. Metsa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Twenty-first Day of December, 2010

David J. Kappos
*Director of the United States Patent and Trademark Office*